(12) United States Patent
Baldwin

(10) Patent No.: US 8,353,545 B1
(45) Date of Patent: Jan. 15, 2013

(54) COMPACT ENERGY ABSORBING VEHICLE CRASH STRUCTURE

(75) Inventor: Michael John Baldwin, Sunnyvale, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/240,780

(22) Filed: Sep. 22, 2011

(51) Int. Cl.
*B60R 19/34* (2006.01)

(52) U.S. Cl. ......... 293/133; 293/155; 188/374; 188/377

(58) Field of Classification Search .................. 293/133, 293/155; 188/374, 377
See application file for complete search history.

(56) References Cited

U.S. PATENT DOCUMENTS

| | | | | |
|---|---|---|---|---|
| 4,152,012 | A | * | 5/1979 | Reidelbach et al. .......... 280/784 |
| 5,181,589 | A | * | 1/1993 | Siegner et al. ................ 188/374 |
| 7,617,916 | B2 | * | 11/2009 | Heatherington et al. ..... 188/371 |
| 7,717,465 | B2 | * | 5/2010 | Hedderly ...................... 280/784 |
| 2012/0074721 | A1 | * | 3/2012 | LaTurner et al. ............. 293/133 |

* cited by examiner

*Primary Examiner* — Dennis Pedder
(74) *Attorney, Agent, or Firm* — Patent Law Office of David G. Beck

(57) ABSTRACT

A crash structure is provided that is interposed between a vehicle's bumper and a vehicle side rail, the crash structure providing relatively level loading in a compact structure that is easily removed and replaced during post-collision repairs. The structure includes an actuator member coupled to the bumper, the actuator member passing into, and slidably disposed within, a hollow housing of the crash structure. The hollow housing contains a plurality of deformable members that at least partially surround a first portion of the actuator member. A second portion of the actuator member, which is between the bumper and the first portion of the actuator member, has a larger diameter than that of the first portion of the actuator member and may be coupled to the first portion via a chamfered transition region.

15 Claims, 8 Drawing Sheets

COMPACT ENERGY ABSORBING VEHICLE CRASH STRUCTURE

FIELD OF THE INVENTION

The present invention relates generally to vehicle crash structures and, more particularly, to a compact crash structure that uses a combination of friction and deformation to achieve a crash structure that yields relatively constant loading during a collision.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. In addition to reducing the potential for personal injuries, many vehicle crash structures are also designed to minimize vehicle damage and simplify post-crash repairs.

A variety of different approaches and structures have been used to absorb and control the transmission of crash energy into the vehicle. As the bumper is typically the first vehicle structure to be impacted during a crash, many crash structures attempt to absorb as much energy as possible in the bumper itself, thus minimizing the energy that is transmitted into the vehicle. For example, U.S. Pat. No. 4,018,466 discloses a bumper assembly in which the bumper is comprised of a hollow beam that houses a plurality of shock absorbing cellular blocks. The shock absorbing cellular blocks are inserted into pocket-like sections of the bumper. In an alternate shock-absorbing bumper, disclosed in U.S. Pat. No. 6,000,738, the bumper includes an outer wall disposed to receive the crash force, an inner wall that is coupled to the vehicle structure and four walls that connect the inner and outer bumper walls. During a car crash, the four connecting walls are designed to bend at a controlled rate, thereby absorbing crash energy.

While crash energy may be absorbed in the bumper, large impact crashes typically require the use of other energy absorbing structures. For example, in a conventional vehicle the bumpers are often coupled to the vehicle by one or more crash boxes that are designed to collapse during a crash, thereby absorbing crash energy. U.S. Pat. No. 7,290,811 discloses one design for a crash box in which two overlapping and interconnected sheet metal shells form the crash box. The crash box is bolted to the bumper cross-member using at least one bolt that extends in a vertical direction through the overlap zone of the structure. U.S. Pat. No. 7,533,913 discloses an alternate crash box design using inner and outer curved members which extend in the longitudinal direction of the vehicle. The inner member includes a plurality of bead-shaped protrusions that are intended to cause longitudinal compressing deformation of this member in a low-speed collision, thereby helping to direct the striking energy created by the collision away from the inside of the vehicle.

While a variety of energy absorbing structures have been designed that are intended to increase the safety of a vehicle's occupants during a collision, in general these systems require various structural components to bend and fold in order to absorb the crash energy, thus requiring a relatively large volume of space to accommodate the collapsing structure. A conventional crash system further exacerbates this inefficient use of vehicle volume since such structures typically rely on two different mechanisms to absorb crash energy, depending upon whether the collision is a low-speed collision or a high-speed collision. Additionally, as such crash structures collapse in a series of steps due to the folding nature of the structure, the energy loading transmitted and applied to the primary vehicle structure, including the passenger compartment, is comprised of a series of peaks and troughs. Accordingly, what is needed is a crash structure that achieves relatively level loading during a crash, requires minimal space, and simplifies post-collision vehicle repairs. The present invention provides such a structure.

SUMMARY OF THE INVENTION

The present invention provides a crash structure that is interposed between a vehicle's bumper and a vehicle side rail, the crash structure providing relatively level loading in a compact structure that is easily removed and replaced during post-collision repairs.

In an exemplary embodiment, the crash structure is comprised of a hollow housing coupled to the vehicle side rail; an actuator member that is coupled to the bumper and passes into, and is slidably disposed within, the hollow housing; and a plurality of deformable members that at least partially surround a first portion of the actuator member. A second portion of the actuator member, which is between the bumper and the first portion of the actuator member, has a larger diameter than that of the first portion of the actuator member and may be coupled to the first portion via a chamfered transition region. The hollow housing and the plurality of deformable members contained therein may be formed using an extrusion process and may be fabricated, for example, from aluminum or an aluminum alloy. Each of the deformable members may be comprised of a hollow structure with at least one wall of the deformable member being common with at least one wall of the hollow housing. The actuator member may be comprised of a cylindrical tube fabricated, for example, of aluminum, an aluminum alloy or steel. The vehicle side rail and the hollow housing may each be comprised of a pair of octagonal-shaped cavities that share a common wall. The vehicle side rail may include a mounting flange to which the hollow housing is coupled. The deformable members may be located in an end region of the hollow housing proximate to the vehicle side rail. The hollow housing may include a second section located in an end region proximate to the bumper, whereby the second section is collapsible. Preferably the second section of the hollow housing is configured to collapse after the plurality of deformable members have been deformed due to passage of the actuator member. The second section may include a plurality of indentations configured to promote the collapse of the second section of the hollow housing. The second section of the hollow housing may include at least one guide member in contact with a portion of the actuator member. The bumper structure may further include a retention plate coupled to an end region of the hollow housing, the retention plate preventing the actuator member from being unintentionally withdrawn from the hollow housing.

A further understanding of the nature and advantages of the present invention may be realized by reference to the remaining portions of the specification and the drawings.

DESCRIPTION OF THE SPECIFIC EMBODIMENTS

Figure 1:
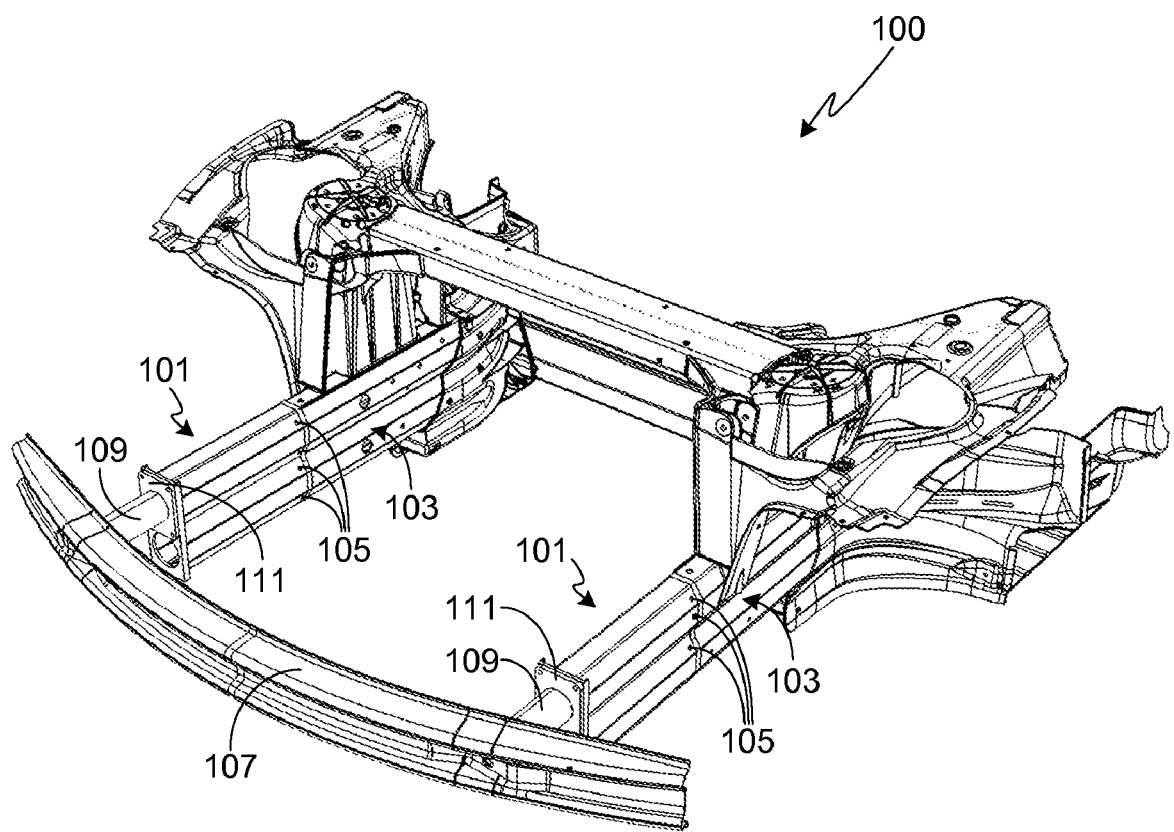
FIG. 1 provides a perspective view of a front vehicle structure in accordance with the invention.
Figure 2:
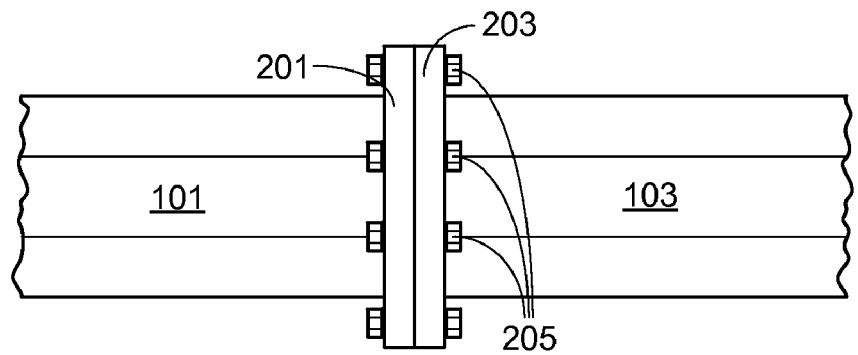
FIG. 2 provides a side view of the complementary flanges used to couple the crash structures to the side rails in one embodiment.
Figure 3:
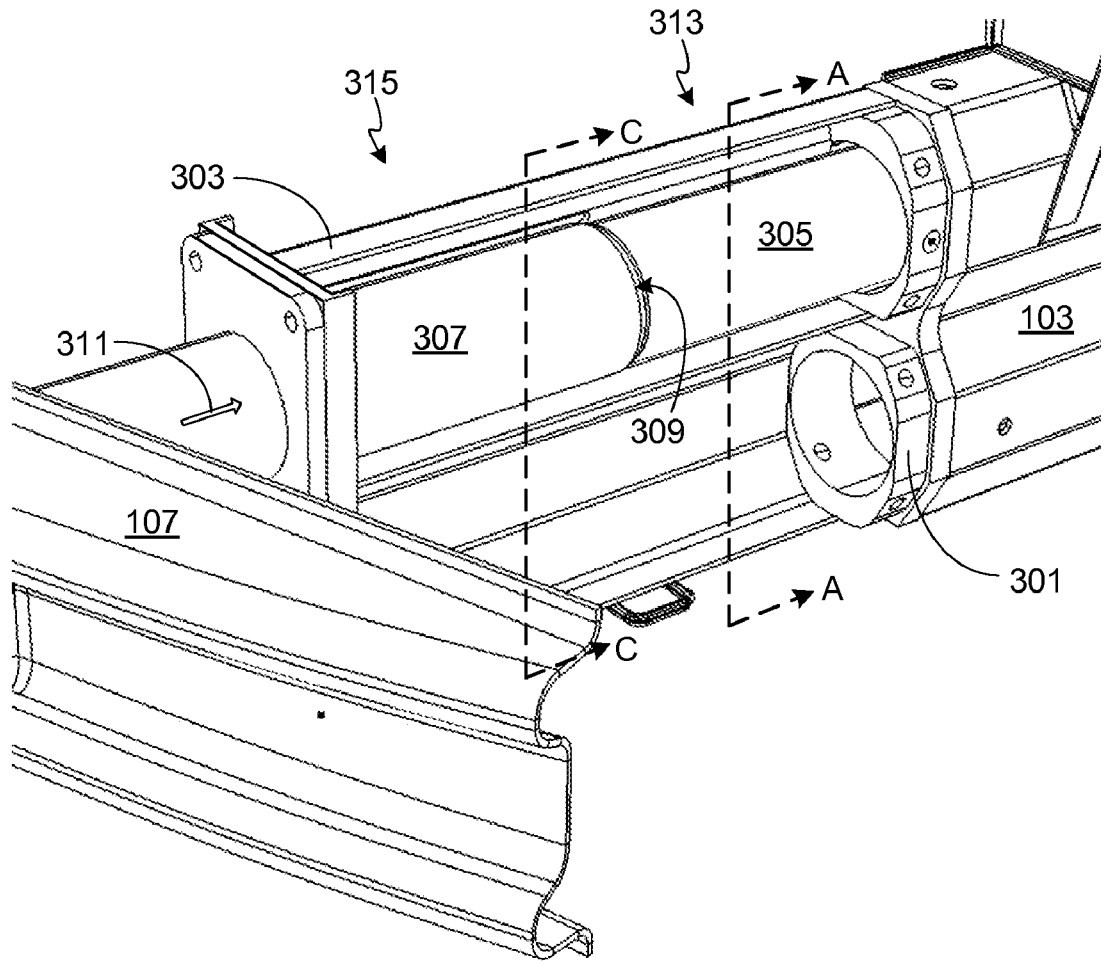
FIG. 3 provides a perspective view of a crash structure with a portion of the outer housing removed.

FIG. 1 is a perspective view of a front vehicle structure 100 in accordance with the invention. Structure 100 includes a pair of energy absorbing structures 101, also referred to herein as crash structures, each of which is coupled to a vehicle side rail 103. Crash structures 101 are detachably coupled to side rails 103 using complementary flanges. The complementary flanges may be comprised of mounting plates located at the complementary ends of the side rails and crash structures, for example as shown in FIG. 2 in which structure 101 includes a mounting flange 201, structure 103 includes a mounting flange 203, and a plurality of bolts 205 hold the two structures together and in place. Alternately, and as shown in FIGS. 1 and 3, a series of bolts or screws 105 may be used to attach an end portion the crash structures 101 to an internal mounting flange 301 of side rails 103. The use of mounting flanges or similar means simplify post-collision repairs by allowing the entire bumper and crash structure assembly to be removed and replaced as needed.

In the preferred embodiment and as illustrated in the accompanying figures, the vehicle side rails 103, which extend in a longitudinal direction and are located on opposite traverse sides of the vehicle as shown, are comprised a pair of octagonally-shaped members that share a common wall. This shape provides strength and rigidity in a relatively low-weight structure. As shown, crash structures 101 utilize the same shape, thus simplifying assembly of the two structures and providing the desired mechanical qualities (i.e., strength, rigidity, weight, fabrication ease, cost, etc.).

Bumper 107 is coupled to the crash structures 101 by a pair of elongated members 109, also referred to herein as actuating members or tubes. Members 109 may be fabricated from steel, aluminum, an aluminum alloy, or other material. Preferably members 109 are comprised of tubes, thus allowing the weight of the members to be minimized while still providing the necessary strength and rigidity. In the preferred embodiment members 109 are comprised of cylindrical tubes, thus simplifying both manufacturing cost and assembly complexity. Members 109 are slidably disposed within crash structures 101. During assembly, after members 109 are inserted into the crash structures and properly positioned, a retention plate 111, or other means, captures members 109, preventing the bumper assembly from being unintentionally dislodged, or partially withdrawn, from the crash structures 101.

FIG. 3 provides a perspective view of one of the crash structures 101. In this view, a portion of the outer crash structure housing 303 has been removed to provide a better view of the location and configuration of tube 109 within the structure. This view also provides a clear view of the internal mounting flange 301 used to mount structure 101 to side rail 103. Preferably housing 303 is fabricated from aluminum or an aluminum alloy using an extrusion process, although it will be appreciated that other materials and fabrication processes may be used.

The rearward section 305 of tubular member 109, i.e., the section of member 109 that is closest to the vehicle's passenger compartment, has a diameter that is smaller than that of the forward section 307 of member 109. The transition region 309 between section 307 and section 305 is gradual, for example using a 45 degree chamfer. In the pre-collision state, and as shown in the cross-sectional view taken along plane A-A shown in FIG. 4, integrated within crash structure housing 303 are a plurality of deformable members 401. In the illustrated configuration, the structure includes four deformable members 401, although it will be appreciated that the structure may use a fewer number, or a greater number, of members 401. The outer surface 403 of section 305 of actuator 109 is adjacent to, and preferably in contact with, surface 405 of each deformable member 401.

Figure 4:
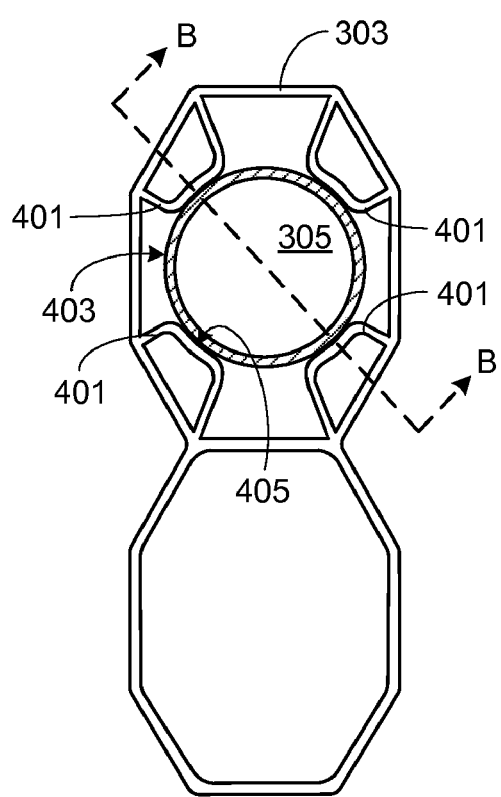
FIG. 4 provides a cross-sectional view of a portion of the crash structure illustrating the structure's deformable members.
Figure 5:
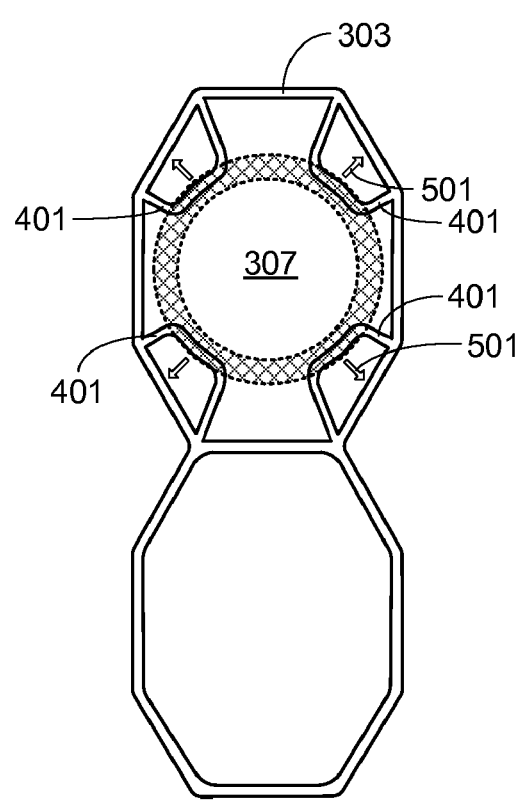
FIG. 5 illustrates the same cross-sectional view shown in FIG. 4, with the addition of the larger diameter portion of the tubular member projected onto the view.
Figure 6:
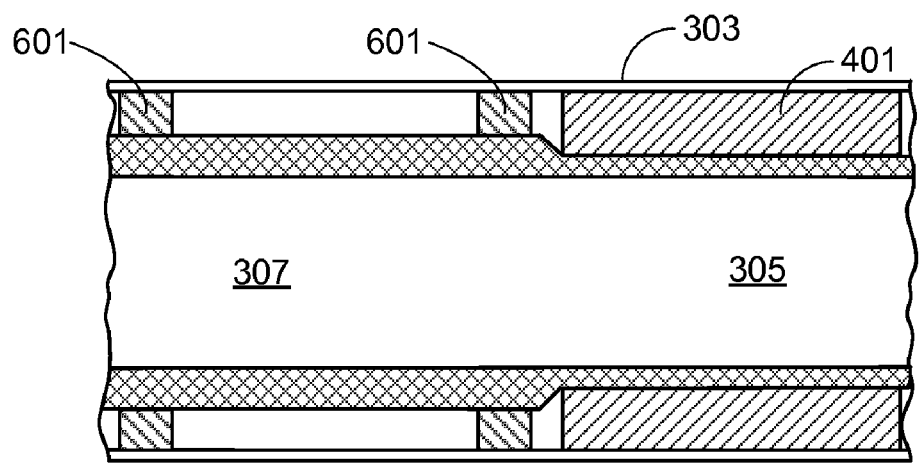
FIG. 6 provides a longitudinal cross-sectional view, taken along plane B-B of FIG. 5, of a portion of the crash structure.

FIG. 5 is identical to FIG. 4, except that it shows the larger diameter of section 307 of actuator 109 projected, in phantom, onto the deformable members 401. The relationship between deformable members 401 and tubular member 109 is also shown in FIG. 6, this figure providing a longitudinal cross-sectional view, taken along plane B-B, of a central portion of the crash structure prior to deformation of deformable members 401. Note that in this figure several guide members 601 are shown in section 315 of housing 303, adjacent to section 307 of actuator member 109.

Figure 7:
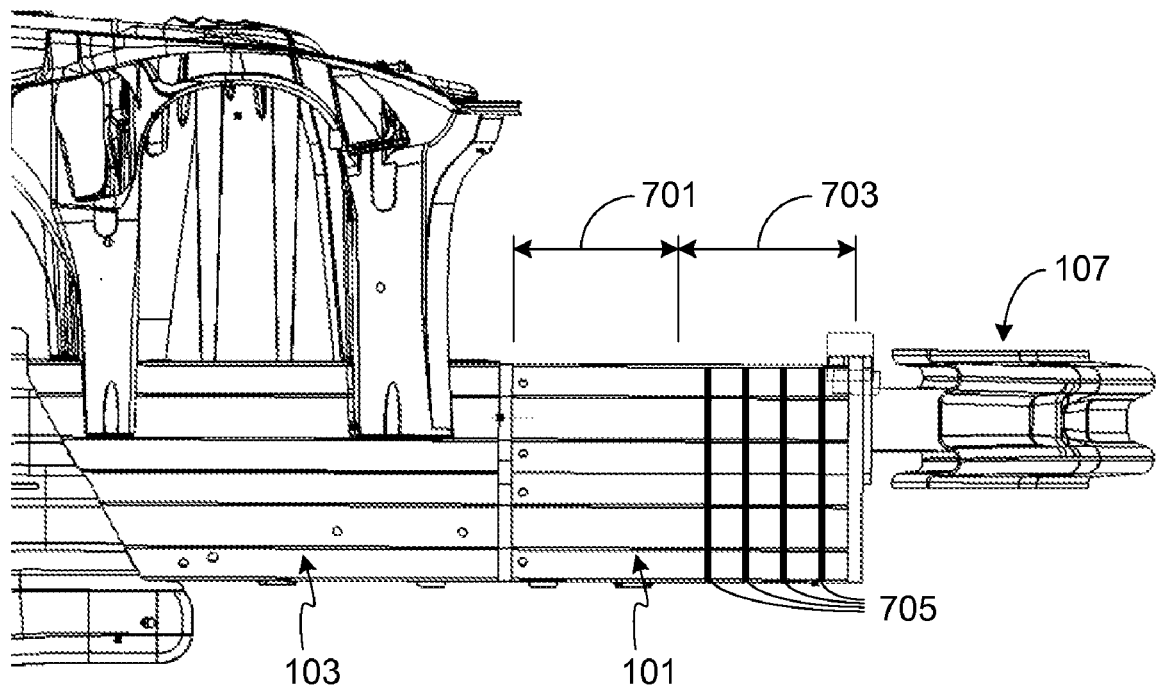
FIG. 7 provides a side view of the crash structure illustrated in FIGS. 1-6.

During a collision, bumper 107 is pushed in a direction 311 as shown in FIG. 3. As member 109 is pushed into housing 303, the leading edge 309 of section 307 deforms the deformable members 401 in a direction 501 (see FIG. 5). Thus the crash energy is absorbed by a combination of the energy required to deform members 401 and the friction between member 109 and the internal members within housing 301. Note that during the initial phase of a collision, the energy is absorbed in the rear section 701 of crash structure 101 (see FIG. 7). Due to this section being adjacent to the primary vehicle structures, e.g., side rails 103 and the various members coupled to rails 103, it is possible to load more energy into the structure than would be acceptable if the deforming members were located close to the bumper and further from the primary vehicle structures as with a conventional crash structure. Additionally, as members 401 are preferably continuous throughout the rear section of housing 301, the loading that results from the passage of member 109 through housing 303 is continuous, rather than being comprised of a series of loading peaks and valleys. As a result, during a collision the passenger compartment is not subjected to a series of jolts as it is when a conventional crash box is used in which the structure deforms through a series of bends and folds.

Figure 8:
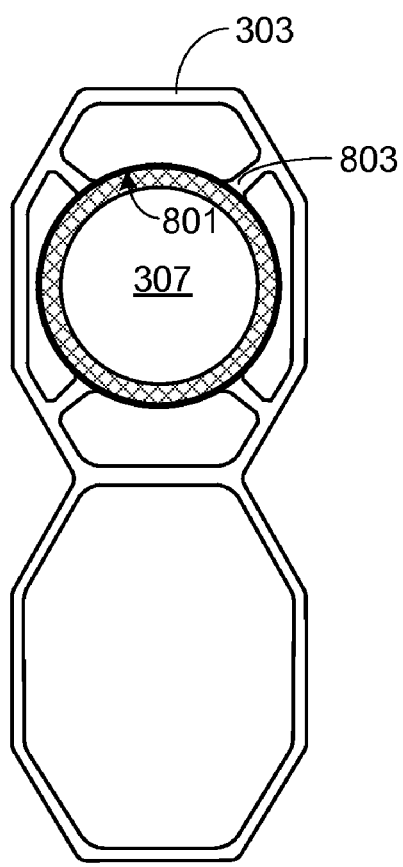
FIG. 8 provides a cross-sectional view of a portion of the crash structure illustrating the structure's guide members.

While the process of deforming the deformable members within rear section 313 of the crash structure are the primary means for absorbing crash energy, energy is also absorbed due to the friction between section 307 of the actuator member 109 and the inner guides within the structure's front section 315, and the friction between section 305 of member 109 and the deformable members 401 prior to deformation, and the friction between the leading edge 309 and the deformable members 401. The amount of energy absorbed in this way depends on the coefficient of friction between the guides and the tubular member as well as the contact area and the fit between the two. In a preferred embodiment illustrated in FIG. 8, surface 801 of guide member 803 is in contact with the entire circumference of section 307 of member 109. Besides providing an additional means of absorbing crash energy via friction, inner guide member 803 also helps to guide actuator 109 through housing 303 during a collision, thereby insuring that the crash structure operates as intended.

The present invention allows the crash structure to be tuned to meet the energy absorbing needs associated with a particular vehicle design, for example altering the amount of force required to deform the deformable members. The primary means for tuning the crash structure include, but are not limited to:

Increasing the difference between the diameter of sections 305 and 307 of member 109, thereby changing the distance that the deformable members must be deformed as member 109 is pushed into the housing.

Changing the angle on transition region 309 of the actuator.

Figure 9:
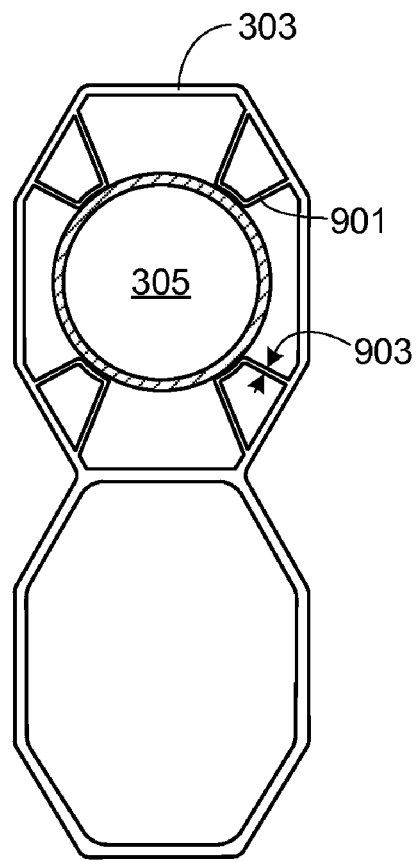
FIG. 9 provides a cross-sectional view of an alternate set of deformable members.
Figure 10:
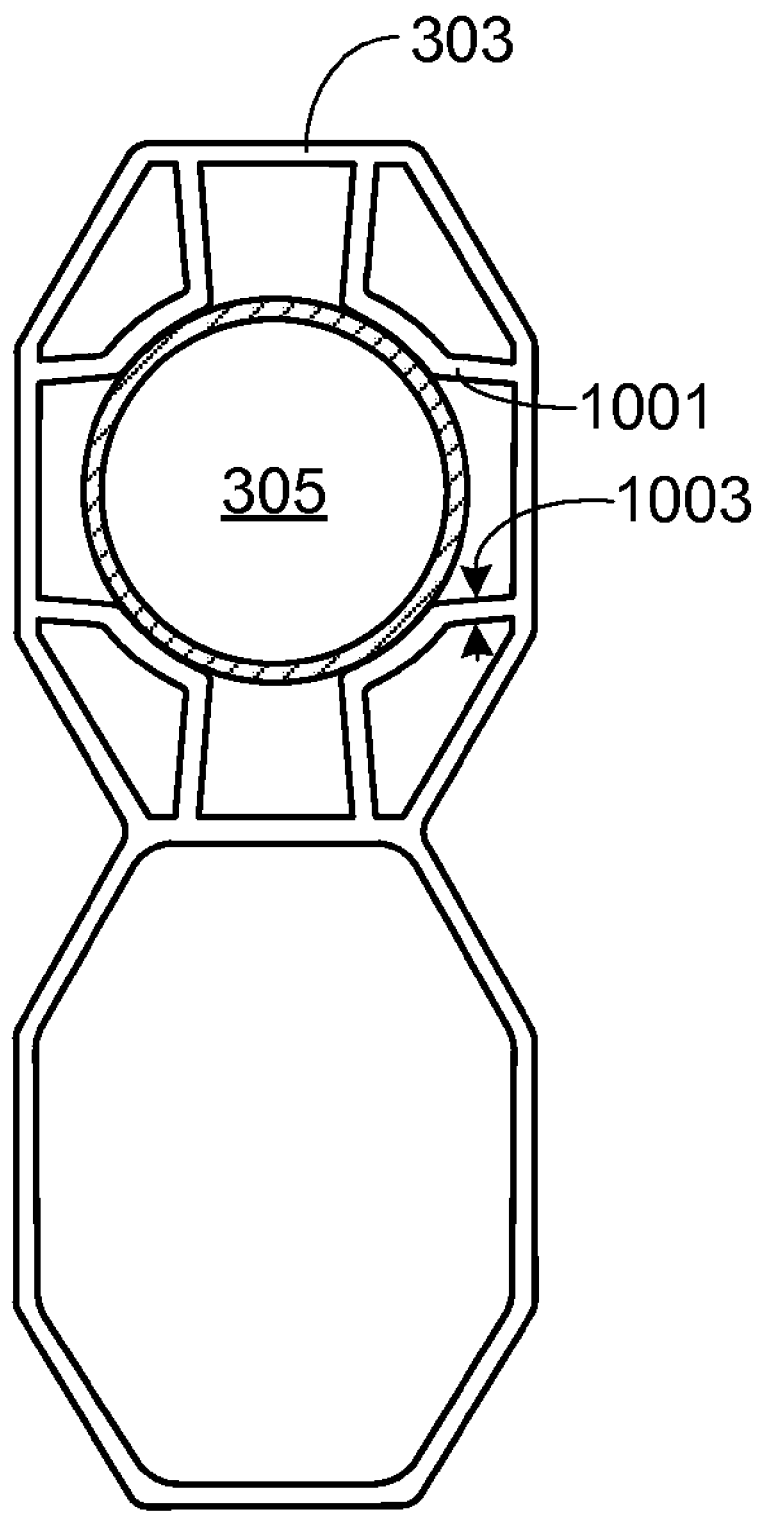
FIG. 10 provides a cross-sectional view of yet another alternate set of deformable members.

Altering the size of the deformable members. For example, FIG. 9 shows an alternate embodiment in which deformable members 901 are smaller and have a thinner wall thickness 903 than those shown in FIG. 4, thus making these members more easily deformed. In an alternate exemplary embodiment illustrated in FIG. 10, deformable members 1001 are larger and have a thicker wall 1003 than those shown in either FIG. 4 or 9, resulting in less easily deformed members.

Changing material characteristics. For example, by changing the composition of housing 303 and internal deformable members 401 from aluminum to steel, or from one steel alloy to another, both the yield strength and the stiffness (i.e., its modulus of elasticity) of the deformable members may be varied in a controllable fashion.

Altering the friction between the actuator member 109 and the deformable members and/or between the actuator member 109 and the guide members, preferably by varying the composition of the components, or applying a coating to one or more contacting surfaces. For example, assuming that both member 109 and the deformable/guide members are fabricated from aluminum, the sliding coefficient of friction between the two is 1.4 while the static coefficient of friction is 1.05-1.35. If one of the members, e.g., member 109, is fabricated from steel while the other members, e.g., the deformable/guide members, are fabricated from aluminum, the sliding coefficient of friction between the two becomes 0.47 while the static coefficient of friction becomes 0.61.

In a preferred embodiment of the invention, if the force of a collision is great enough, after the larger section of the tubular members passes completely through section 313 of the crash structure, thereby completely deforming the deformable members contained therein, the forward section 703 of the crash structure collapses providing a secondary level of collision energy absorption. In such a configuration, preferably the internal guide members are only included within a small portion of section 315, thus promoting the collapse of section 703 in a high force collision once actuator 109 has passed sufficiently through the crash structure to deform the internal deformable structures. In at least one embodiment, the forward section 315 of the crash structure includes multiple indentations 705 or other means to further promote the collapsing of section 703.

Figure 11:
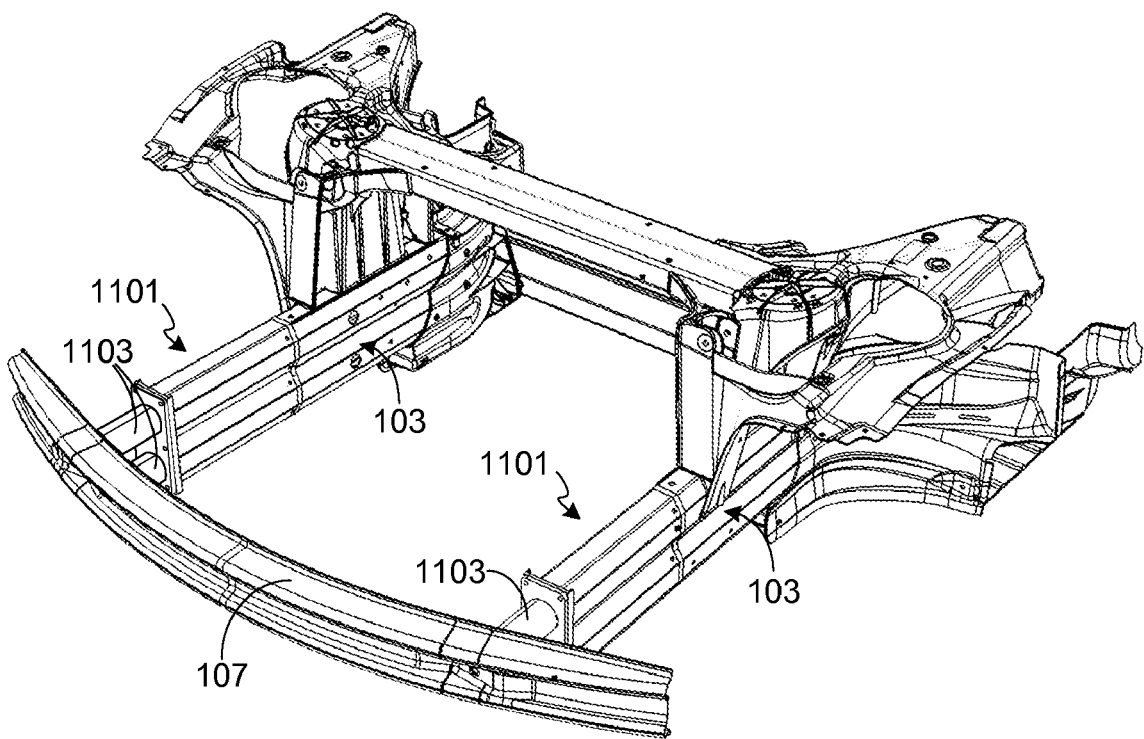
FIG. 11 provides a perspective view of an alternate embodiment utilizing two pairs of crash structures.
Figure 12:
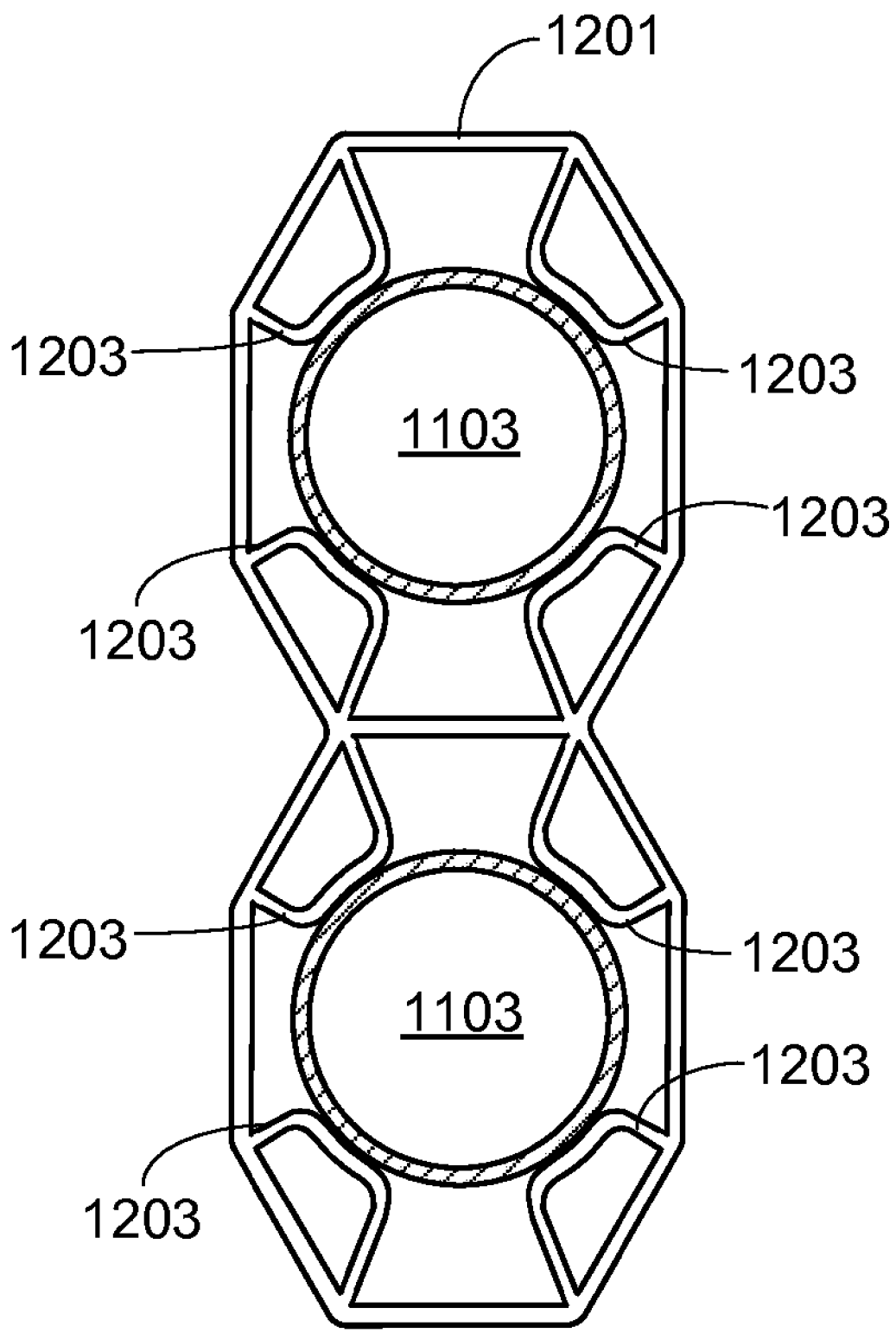
FIG. 12 provides a cross-sectional view of the two sets of deformable members used in conjunction with the pair of crash structures shown in FIG. 11.

Although the inventor has found that typically a vehicle structure only requires a pair of crash structures, one attached to each side of the bumper as described and illustrated above, it should be understood that the crash structure of the invention may be used in other configurations without departing from the underlying concept. For example, in the embodiment illustrated in FIG. 11 each crash structure 1101 includes a pair of actuator members 1103 coupled to each end of bumper 107, thus providing increased energy absorption capabilities. As in the prior embodiments, and as illustrated in the cross-sectional view of FIG. 12, within each housing 1201 are two sets of deformable members 1203, each set corresponding to an actuator member 1103.

While the crash structure of the present invention has been shown relative to the front structure of a vehicle, it should be understood that the present invention is equally applicable to the rear vehicle structure, thereby enhancing passenger safety in collisions in which the rear of the vehicle is hit.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. A bumper structure, comprising:
 a bumper;
 an actuator member coupled to said bumper; and
 a crash structure interposed between said bumper and a vehicle side rail extending in a vehicle longitudinal direction, said crash structure comprising:
  a hollow housing coupled to said vehicle side rail, wherein a section of said actuator member passes into and is slidably disposed within said hollow housing; and
  a plurality of deformable members contained within a section of said hollow housing, wherein each of said plurality of deformable members is comprised of a hollow structure with at least one wall of said hollow structure being common with at least one wall of said hollow housing, wherein a first portion of said actuator member is at least partially surrounded by said plurality of deformable members, wherein said first portion of said actuator member is of a first diameter, and wherein a second portion of said actuator member is of a second diameter larger than said first diameter, and wherein said second portion of said actuator member is closer to said bumper than said first portion of said actuator member.

2. The bumper structure of claim 1, wherein said plurality of deformable members are integral to said hollow housing, and wherein said hollow housing and said plurality of deformable members are extruded.

3. The bumper structure of claim 2, wherein said hollow housing and said plurality of deformable members are comprised of aluminum or an aluminum alloy.

4. The bumper structure of claim 1, wherein said actuator member is comprised of a cylindrical tube.

5. The bumper structure of claim 4, wherein said cylindrical tube is fabricated from a material selected from the group of materials consisting of aluminum, aluminum alloys and steel.

6. The bumper structure of claim 1, wherein said actuator member includes a chamfered transition region between said first and second portions.

7. The bumper structure of claim 1, wherein said vehicle side rail is comprised of a first pair of octagonal-shaped cavities that share a side rail common wall, and wherein said hollow housing is comprised of a second pair of octagonal-shaped cavities that share a housing common wall, and wherein said actuator member is slidably disposed within a first octagonal-shaped cavity of said second pair of octagonal-shaped cavities of said hollow housing.

8. The bumper structure of claim 1, wherein said hollow housing further comprises a first mounting flange, wherein said vehicle side rail further comprises a second mounting flange, and wherein said hollow housing is coupled to said vehicle side rail by attaching said first mounting flange to said second mounting flange.

9. The bumper structure of claim 1, wherein said vehicle side rail further comprises a mounting flange, and wherein said hollow housing is coupled to said vehicle side rail by attaching said hollow housing to said mounting flange.

10. The bumper structure of claim 1, wherein said section of said hollow housing containing said plurality of deformable members is located at an end region of said hollow housing, wherein said end region is proximate to said vehicle side rail.

11. The bumper structure of claim 10, wherein a said hollow housing further comprises a collapsible region, said collapsible region distal from said end region of said hollow housing and distal from said section of said hollow housing containing said plurality of deformable members, wherein said collapsible region is proximate to said bumper.

12. The bumper structure of claim 11, wherein said collapsible region is configured to collapse after deformation of said plurality of deformable members.

13. The bumper structure of claim 11, wherein said hollow housing includes a plurality of indentations configured to promote collapsing of said collapsible region.

14. The bumper structure of claim 1, wherein said section of said hollow housing containing said plurality of deformable structures is located at an end region of said hollow housing, wherein said end region is proximate to said vehicle side rail, wherein a second section of said hollow housing is located at a second end region of said hollow housing, wherein said second end region is proximate to said bumper, and wherein said second section of said hollow housing includes at least one guide member in contact with said second portion of said actuator member.

15. The bumper structure of claim 1, further comprising a retention plate coupled to an end region of said hollow housing, wherein said end region is proximate to said bumper, and wherein said retention plate prevents said actuator member from being withdrawn from said hollow housing.

* * * * *